US006892260B2

(12) United States Patent
Burgess

(10) Patent No.: US 6,892,260 B2
(45) Date of Patent: May 10, 2005

(54) INTERRUPT PROCESSING IN A DATA PROCESSING SYSTEM

(75) Inventor: David P. Burgess, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 460 days.

(21) Appl. No.: 09/998,506

(22) Filed: Nov. 30, 2001

(65) Prior Publication Data

US 2003/0105902 A1 Jun. 5, 2003

(51) Int. Cl.[7] .............................................. G06F 13/24
(52) U.S. Cl. ..................... 710/260; 710/263; 712/244
(58) Field of Search ................................ 710/260, 263, 710/262; 712/218, 244

(56) References Cited

U.S. PATENT DOCUMENTS

| 5,193,167 A | * | 3/1993 | Sites et al. | 711/163 |
| 5,742,785 A | * | 4/1998 | Stone et al. | 712/217 |
| 6,076,183 A | * | 6/2000 | Espie et al. | 714/764 |
| 6,473,850 B1 | * | 10/2002 | Cheong et al. | 712/244 |
| 2002/0087769 A1 | * | 7/2002 | McKenney et al. | 710/200 |
| 2003/0070021 A1 | * | 4/2003 | Joy et al. | 710/200 |

* cited by examiner

Primary Examiner—Tim Vo
Assistant Examiner—Nimesh G Patel
(74) Attorney, Agent, or Firm—Joanna G. Chiu; Daniel D. Hill

(57) ABSTRACT

The present invention relates generally to interrupt processing. One embodiment relates to a method for executing an interrupt in a data processing system including fetching a conditional store instruction that is conditional upon a reservation, receiving notice that an interrupt is pending, invalidating a reservation in response to receiving the notice, and processing the interrupt. Invalidating the reservation allows the conditional store instruction to finish in a predetermined amount of time and properly update an architectural state of the processor. Therefore, interrupt latencies (the amount of time between receiving and processing an interrupt) corresponding to the conditional store instruction can be bounded. The method may be used in a single processor or multi-processor data processing system, wherein each processor includes a reservation register. Furthermore, each processor may include both a completion unit for storing instructions in the order they are issued and a store queue within a load/store unit.

17 Claims, 3 Drawing Sheets

INTERRUPT PROCESSING IN A DATA PROCESSING SYSTEM

FIELD OF THE INVENTION

The present invention relates generally to data processing systems and more specifically, to interrupt processing in a data processing system.

RELATED ART

During operation of a data processing system, the data processing system may receive an external interrupt that needs to be processed. At the time the external interrupt is received, though, the data processing system may be executing an instruction that must run to completion prior to processing the interrupt because if such instructions are terminated prior to completion, invalid results may be obtained. Some of these instructions that require completion prior to processing an interrupt, though, may take an unbounded amount of time to complete, thus causing large, difficult to control interrupt latencies (i.e. the amount of time between receiving the interrupt and processing the interrupt). Large interrupt latencies adversely affect a data processing system's performance. Therefore, a need exists for a data processing system having improved interrupt latencies.

BRIEF DESCRIPTION OF THE DRAWINGS

The present invention is illustrated by way of example and not limited by the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. Furthermore, the conductors as discussed herein (or as shown in the figures) may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The term "assert" is used when referring to the rendering of a signal, status bit, or similar apparatus into its logically true state. The term "negate" or "deassert" is used when referring to the rendering of a signal, status bit, or similar apparatus into its logically false state. If a signal (or status bit, etc.) is active high, the logically true state is a logic level one, and the logically false state is a logic level zero. If a signal (or status bit, etc.) is active low, the logically true state is a logic level zero, and the logically false state is a logic level one.

Figure 1:
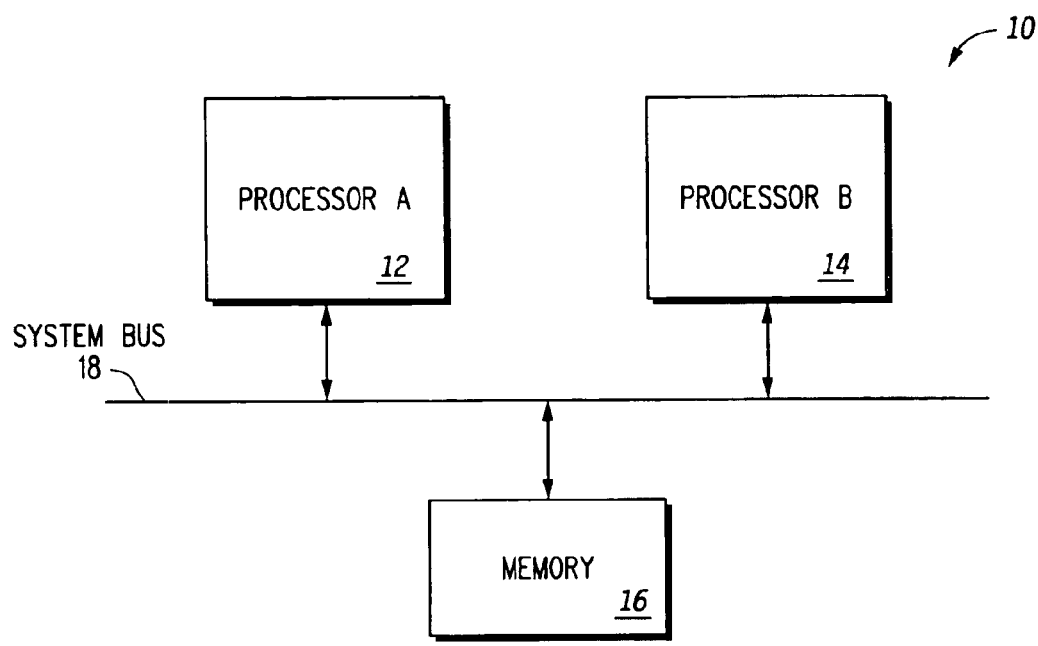
FIG. 1 illustrates, in block diagram form, a data processing system in accordance with one embodiment of the present invention.

FIG. 1 illustrates one embodiment of a data processing system 10. Data processing system 10 includes processor A 12, processor B 14, and memory 16 each bidirectionally coupled to a system bus 18. In operation, both processor A 12 and processor B 14 can access a shared resource such as memory 16. For example, both processors A and B may need to access a same data structure stored within memory 16 where simultaneous accesses to the data structure is not allowed. To avoid simultaneous access, each processor A and B may wish to secure or "lock" the data structure while executing a critical section of code (i.e. code which accesses the data structure). Therefore, the lock serves as a semaphore to prevent simultaneous access. The same situation may occur within a multi-tasking uni-processor data processing system where multiple tasks need to access a same data structure or shared resource and where simultaneous access is not allowed. Each task may therefore wish to lock the shared resource or data structure so as to prevent simultaneous access.

One example of the semaphore locking system described above includes the use of a load and reserve instruction and a conditional store instruction. For example, the PowerPC (TM of International Business Machines Corp.) processor includes a load and reserve instruction (lwarx) and a conditional store instruction (stwcx). Therefore, the following discussions in reference to FIGS. 1–3 will use the lwarx and stwcx instructions for explanation purposes where, in one embodiment, processor A and B may each be a PowerPC processor. The concept behind the use of the lwarx and stwcx instructions is that a processor (such as processor A or B) may load a semaphore from memory, compute a result based on the value of the semaphore, and conditionally store it back to the same location. The conditional store (stwcx) is performed based upon the existence of a reservation established by the preceding lwarx instruction. If the reservation exists when the conditional store (stwcx) is executed, a store is performed to a target memory location and a bit is set in the condition code register (CR) of the processor. In one embodiment, this bit is the EQ (equal) bit within the CR (i.e. CR[EQ]). (Note that the CR[EQ] will be used in the descriptions herein; however, alternate embodiments may use a different bit within the CR or elsewhere in the processor to update the architectural state of the processor.) If the reservation does not exist when the store is executed, the target memory location is not modified and the CR[EQ] bit is deasserted (e.g. cleared). Therefore, a bit within the CR (e.g. CR[EQ]) is set or cleared depending on the success or failure, respectively, of the conditional store. Conversely, the CR[EQ] bit, which is part of the architectural state of the processor, indicates the success or failure of the conditional store instruction. Therefore, the use of lwarx and stwcx instructions allows programmers to emulate common semaphore operations such as "test and set," "compare and swap," "exchange memory," "fetch and add," etc.

Each processor (such as processor A and B) within data processing system 10 has its own reservation register that is used by the lwarx and stwcx instructions. The reservation register has a physical address (PA) portion and a valid portion. The PA portion stores the physical address of the target memory location. For example, in the case of a "test and set" operation, the PA portion stores the physical address of the "lock" location (the location in memory that is accessed by a processor to determine, for example, whether the lock has been set and a critical section of code has exclusive access to a data structure). For example, a value of 0 stored in the lock location may indicate the lock is not set while a value of 1 stored in the lock location may indicate that the lock is set. Whenever the lock is set, only the owner of the lock (i.e., the thread or process that set the lock) may access the shared data structure. This lock location may be any agreed upon or predetermined location within memory 16 that is known by any processes that need exclusive access to the data structure. The valid portion of the reservation register indicates to its corresponding processor that it has a valid "reservation" for the lock location designated by the PA portion. For example, in the reservation register of processor A, a value of 0 in the valid portion may indicate that processor A does not have a valid reservation for the physical address in the PA portion while a value of 1 may indicate that processor A does have a valid reservation.

The following excerpt of code illustrates an example of how the lwarx and stwcx instructions can be used to emulate a "test and set" instruction used in the acquisition of a lock (note that the "#" symbol indicates a comment to the code): top:

```
lwarx    r3, PA      # read the current value from the lock location
cmpwi    r3, 0       # compare to 0 to determine if it is
                     # already locked
bne      top         # branch to top if already locked
addi     r3, r3, 1   # increment the lock value to 1
stwcx.   r3, PA       # try to store 1 to the lock location
bne      top         # branch to top if the store was not successful
# critical code section:
# instructions accessing the locked
# data structure go here
stw      0, PA       # release the lock
```

Upon executing the lwarx instruction in the above code excerpt, the contents of the lock location (indicated by PA) is loaded into r3 (one of the general purpose registers (GPR)) and a reservation is established for the lock location (i.e., the PA portion of the reservation register is assigned the physical address of the lock location and the valid portion of the reservation register is asserted). The cmpwi instruction then compares the contents of the lock location (now in r3) to 0 to see if the lock is already set (indicated by a non-zero value). If the result of the compare instruction indicates that the lock is already set, the bne (branch if the previous comparison was not equal to zero) causes program flow to return to the top of the loop, labeled "top."; otherwise, program flow falls through to the addi instruction where the value of r3 is incremented such that it becomes non-zero.

The stwcx instruction (conditional store) then attempts to store the incremented value to the lock location. If the processor still has a valid reservation for the lock location (i.e. the PA portion of the reservation register matches the physical address of the lock location and the valid portion of the reservation register is still asserted) then the stwcx instruction stores the new value of r3 to the lock location (indicated by PA) and sets CR[EQ] to indicate that the lock was successfully obtained. If, however, a valid reservation no longer exists, the stwcx instruction does not alter the contents of the lock location, and it clears (i.e. deasserts) CR[EQ] to indicate the failure of the store operation. Finally, the bne instruction following the stwcx instruction directs the program flow according to whether or not the lock was acquired (i.e. whether or not the stwcx was successful, as indicated by CR[EQ]). If the stwcx was successful (i.e., CR[EQ] is set), the program flow will continue into the critical code section; otherwise, the lock was not acquired and program flow will be directed back to the top of the loop for another attempt at acquiring the lock. After the critical code section, the lock is cleared by storing a 0 to the lock location, indicating that the shared structure accessed by the critical code is no longer in use.

In one embodiment, the actions of the conditional store (e.g. stwcx) instruction are inextricable. That is, if the store is performed (i.e., the target location is altered), CR[EQ] must be set; otherwise, CR[EQ] must be cleared. In this manner, the architectural state of the processor is properly updated. This presents a problem when an external interrupt (e.g. any asynchronous interrupt) is received during execution of the stwcx instruction. The interrupt should not affect the stwcx instruction in such a way that, for example, the target location is altered but CR[EQ] is not set. Therefore, the stwcx instruction should be completed prior to processing the interrupt for the CR to be updated. Unfortunately, the stwcx instruction may have a long (effectively unbounded) latency if, for example, there are multiple stores before the stwcx, or the stwcx attempts to store to a location that is not in the cache and is required to go out to system bus 18 to access the physical address. Therefore, if a fixed (and preferably, short) interrupt latency is desired, a processor needs to ensure that it can safely and correctly finish or abort the stwcx instruction within a fixed period (i.e. within a predetermined amount of time).

As described above, a conditional store, via the stwcx instruction, is only successful (i.e., the target location is altered) if a valid reservation exists (i.e. if the valid portion is asserted). However, a reservation can be cancelled by clearing (deasserting) the valid portion of the reservation register. If the reservation is cancelled (e.g. due to activity on the system bus 18), the stwcx instruction is aborted and CR[EQ] is set or cleared according to whether or not the target location is altered. In one embodiment, the amount of time for the stwcx to be finished or aborted when the reservation is cancelled is 5 cycles. Therefore, if a reservation is also cancelled upon receiving an external interrupt, the stwcx instruction will terminate and report the correct status to the CR within a fixed latency (i.e. the 5 cycles) and the processor can begin processing the external interrupt. (Note that alternate embodiments may have a fixed latency of more or less than 5 cycles). Operation of the cancellation of a reservation in response to an external interrupt will be described below in reference to FIGS. 2 and 3.

Figure 2:
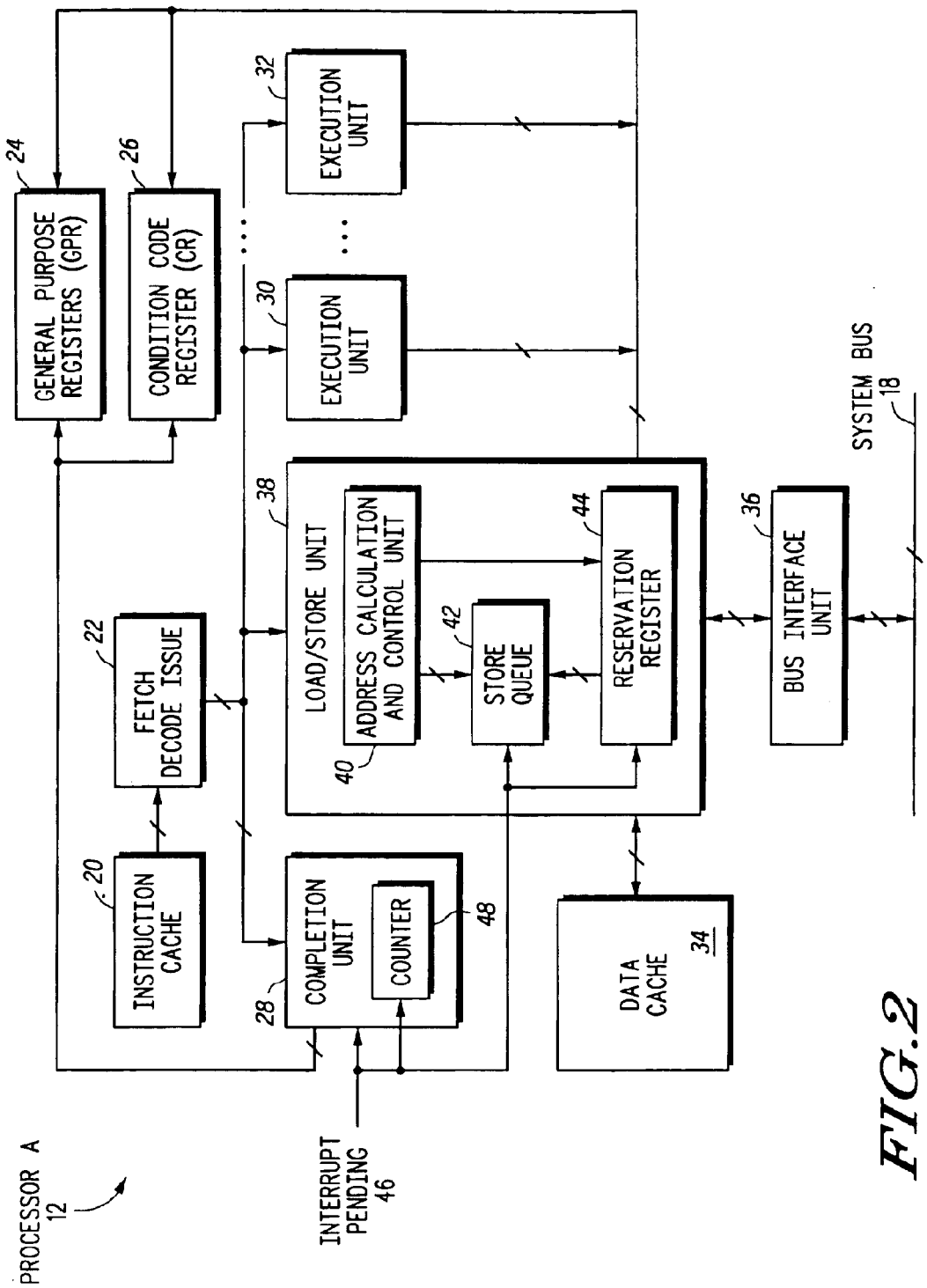
FIG. 2 illustrates, in block diagram form, a processor within a data processing system, in accordance with one embodiment of the present invention.

FIG. 2 illustrates, in block diagram form, a portion of processor A 12 (of FIG. 1). Processor A 12 includes an instruction cache 20, a fetch-decode-issue unit 22, general purpose registers (GPR) 24, a condition code register (CR), a completion unit 28, a load/store unit 38, execution units 30 and 32, a data cache 34, a bus interface unit (BIU) 36, and a system bus 18. The fetch-decode-issue unit 22 is coupled to instruction cache 20, completion unit 28, load/store unit 38, and execution units 30 and 32. Note that while only two execution units (30 and 32) are illustrated in FIG. 2, any number of execution units may be coupled to fetch-decode-unit 22, depending on the design of processor A 12. Each of these execution units may be a functional unit, a vector unit, a load/store unit, a branch unit, etc. Data cache 34 is coupled to load/store unit 38. Load/store unit 38 is coupled to BIU 36 and receives interrupt pending signal 46. Load/store unit 38 includes address calculation and control unit 40, store queue 42, and reservation register 44. Store queue 42 is coupled to address calculation and control unit 40 and reservation register 44. Store queue 42 and reservation register 44 receive interrupt pending signal 46. Completion unit 28 includes counter 48 which receives interrupt pending signal 46. BIU 36 is coupled to system bus 18. GPR 24 and CR 26 are each coupled to completion unit 38, load/store unit 38, and execution units 30 and 32.

In operation, instruction cache 20 provides instructions to fetch-decode-issue unit 22. In alternate embodiments, instructions may be provided to fetch-decode-issue unit 22 from any type of instruction memory. Fetch-decode-issue unit 22 then fetches, decodes, and issues the instructions in the order they are received from instruction cache 20 both to completion unit 28 and the appropriate execution unit (such as any one of load/store unit 38, execution unit 30, and execution unit 32). Completion unit 28 includes a completion queue storing the instructions as they are received, where each entry in the completion queue includes the instruction, a finish indicator to indicate whether the instruction has reported its exception status (and in the case of some instructions, such as, for example, an add or a load, whether it has obtained its results), and an exception indicator to indicate whether the instruction caused an exception. For example, an instruction within a later entry of the completion queue may be "finished" (have its finish indicator set) before the oldest entry in the queue because some instructions take less time to report its exception status or obtain a result. The oldest entry in the queue (e.g. located at the "bottom" of the queue) is removed if its finish indicator indicates that the instruction has reported its exception status (and in some cases, obtained its results) and is ready for further processing.

If a store instruction is issued to load/store unit 38, address calculation and control unit 40 calculates the effective address for the destination of the store instruction, translates the effective address to a physical address, and determines whether the store instruction will cause any exceptions. Load/store unit 38 can then report to completion unit 28 the exception status for the store instruction thus indicating that the store instruction has "finished." (Completion unit 28 then asserts its corresponding finish indicator and exception indicator accordingly.) The store instruction is then stored in store queue 42. Each instruction in store queue 42 has an associated non-speculative indicator which indicates whether the store instruction is non-speculative or not. An instruction is considered non-speculative when it reaches the bottom of completion queue 28 (i.e. becomes the oldest entry in the queue). Therefore, when a store instruction becomes non-speculative (reaches the bottom of the completion queue), its corresponding indicator in store queue 42 is asserted to indicate that the store instruction is now non-speculative. The instructions in store queue 42 then wait their turn to access their appropriate destination (such as data cache 34, memory 16 via system bus 18, etc.).

In the case of a lwarx instruction issued to load/store unit 38, the physical address of the lock location is loaded into reservation register 44, as described above, and the valid portion of reservation register 44 is asserted. (Operation in reference to conditional store (e.g. stwcx) instructions will be described further below in reference to FIG. 3.)

When an external interrupt is received (indicated by interrupt pending signal 46), the completion queue gets flushed, and all entries that are not marked as non-speculative in store queue 42 get flushed. Therefore, the only entries that remain in store queue 42 are those that are marked as non-speculative. These non-speculative stores continue to wait their turn until sufficient resources open up that allow them to perform their operation. Therefore, when an external exception is received during an instruction, all instructions before that instruction are completed, and all those following it are flushed. Store queue 42 ensures that the store instructions marked as non-speculative continue to be processed in turn even though an interrupt is received.

Figure 3:
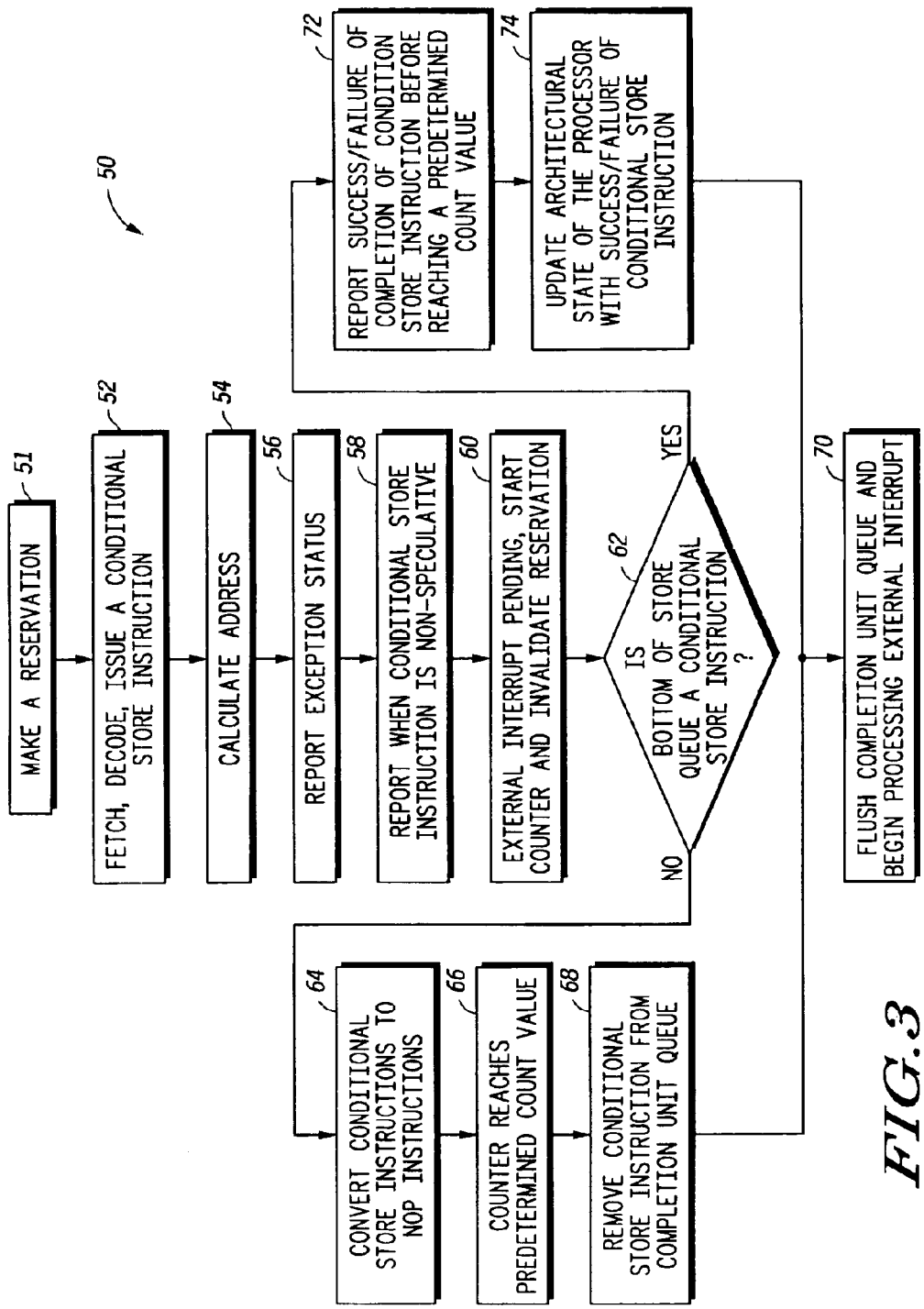
FIG. 3 illustrates, in flow diagram form, a method of operating the processor of FIG. 2 in accordance with one embodiment of the present invention.

FIG. 3 illustrates, in flow diagram form, operation of one embodiment of processor A during the execution of a stwcx instruction. Flow begins at block 51 where a reservation is made (such as by executing a lwarx instruction which asserts the valid portion of reservation register 44) and a physical address is stored within the PA portion of reservation register 44. Flow continues to block 52 where a conditional store instruction (stwcx instruction) is fetched, decoded, and issued to load/store unit 38 and completion unit 28. In block 54, the physical address is calculated for the lock location (in address calculation and control unit 40) and in block 56, address calculation and control unit 40 reports the exception status of the stwcx instruction to completion unit 28. That is, address calculation and control unit 40 reports to completion unit 28 whether the stwcx instruction will cause an exception. (Also, it is at this point that the corresponding finish indicator in the completion queue is asserted.) Flow proceeds to block 58 where completion unit 28 reports to load/store unit 38 that the stwcx instruction is non-speculative. That is, the stwcx instruction is considered non-speculative when it becomes the oldest entry in the completion queue (i.e. when it reaches the bottom of the completion queue).

Flow proceeds to block 60 where an external interrupt is received and is currently pending, indicated to completion unit 28 and load/store unit 38 via interrupt pending signal 46. Counter 48 within completion unit 28 is started and the valid portion of reservation register 44 is invalidated (i.e. deasserted). Since an external exception was received, the reservation is cancelled (i.e. the valid portion is invalidated) such that the time required by the current stwcx instruction to be completed and report a success or failure to completion unit 28 is limited. As discussed above, once a reservation is cancelled, a predetermined amount of time is needed for the stwcx instruction (via load/store unit 38) to report a failure (indicating that a store was not performed) to completion unit 28. This ensures that the maximum time for the stwcx instruction to complete and update the CR is the predetermined amount of time needed for a stwcx instruction to complete following a reservation cancellation. (In one embodiment, as mentioned above, this predetermined amount of time is 5 cycles).

At decision diamond 62, it is determined whether a stwcx instruction is at the bottom location of store queue 42. If so, flow proceeds to block 72 where the success or failure of the completion of the stwcx instruction is reported before reaching a predetermined count value (which corresponds to the predetermined amount of time for the stwcx to complete, e.g. report a failure, after a reservation cancellation referred to in the previous paragraph). If the stwcx instruction was already dispatched from store queue 42, it is possible that the store is performed and success is reported prior to the reservation cancellation. However, in order for this to occur, the success must occur within the predetermined amount of time. Since the reservation was cancelled, though, the maximum amount of time to report a success/failure to completion unit 28 is the predetermined amount of time. If the reservation were not cancelled in block 62, the reporting of the success/failure of the completion of the stwcx instruction would take an undeterminable amount of time. Furthermore, this undeterminable amount of time may be a large amount of time, much greater than the predetermined amount of time for the reservation cancellation to report a failure. Thus the reservation cancellation in block 60 ensures the report of a success/failure (block 72) before the counter reaches its predetermined count value.

Flow proceeds to block 74 where the architectural state of the processor is updated with the success/failure indication of the stwcx instruction received from store queue 42. That is, if the stwcx succeeded in performing its store operation, CR[EQ] is set (asserted); however, if the stwcx did not succeed, then CR[EQ] is cleared (deasserted). If the stwcx was never dispatched from store queue 42, the reservation cancellation would at least ensure that a failure is reported to completion unit 28, thus allowing the CR to be properly updated.

At decision diamond 62, if the stwcx instruction is not at the bottom of store queue 42, flow proceeds to block 64. In this case, store queue 42 may have other non-speculative store instructions which are not conditional stores ahead of the stwcx instruction. Therefore, in block 64, all the conditional store instructions (stwcx instructions) within store queue 42 are converted to NOP (no operation) instructions. However, the completion queue still holds the stwcx instruction until the counter reaches its predetermined value. When the counter reaches its predetermined count value, the stwcx instruction is removed from the completion queue (block 68). When the NOP instruction (previously the non-speculative stwcx instruction) gets dispatched from store queue 42, the state of the processor is not affected due to the NOP instruction. Otherwise, without the conversion to a NOP, the stwcx instruction would attempt to report a success/failure to completion unit 28 for a stwcx instruction that no longer exists in the completion queue. That is, counter 48 ensures that the stwcx instruction is removed from the completion queue and the NOP conversion ensures the stwcx is taken care of in store queue 42.

Flow proceeds from both blocks 68 and 74 to block 70 where the completion queue is flushed and processing of the external interrupt begins. After handling the external interrupt, if the flow through blocks 64, 66, and 68 was taken, flow returns to the stwcx instruction that was interrupted (which was never completed and thus removed from the completion queue due to counter 48). However, if the flow through blocks 72 and 74 was taken, flow returns to the instruction following the stwcx instruction, since the instruction was already completed (either actually completed, or completed due to the reservation cancellation, and thus allowing the architectural state, i.e. the CR, to be updated). Therefore, it can be appreciated that due to the cancellation of the reservation, the use of counter 48, and the NOP conversions work together to ensure that the external interrupt latency is at most the predetermined amount of time required to report a failure after a reservation cancellation. Alternate embodiments may always convert the stwcx instructions to NOP and use the counter to time out regardless of whether the interrupted stwcx instruction is at the bottom of store queue 42. In this case, after handling the interrupt, flow would pick up again with the interrupted stwcx instruction.

Processor B of FIG. 1 has not been described in reference to FIGS. 2 and 3; however, in one embodiment, it may be the same type of processor as processor A, or in alternate embodiments, it can be a different type of processor having a reservation register as well. Alternatively, data processing system 10 of FIG. 1 can have a single processor or more than just the two illustrated. Alternatively, memory 16 can be any shared resource between the processors. The load and reserve instruction and store instructions discussed above can be used as a semaphore method for many different purposes, and is not limited to simply the locking and unlocking of critical sections of code. Furthermore, although the descriptions above were made in reference to specific instructions such as the lwarx and stwcx, any type of load and reserve instruction and conditional store instruction may be used.

Although the invention has been described with respect to specific conductivity types or polarity of potentials, skilled artisans appreciated that conductivity types and polarities of potentials may be reversed.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for executing an interrupt in a data processing system comprising the steps of:
    fetching a conditional store instruction that is conditional upon a reservation;
    receiving notice that an interrupt is pending in the data processing system, wherein the receiving the notice that an interrupt is pending further comprises starting a counter in response to receiving the notice;
    invalidating the reservation in response to receiving the notice, wherein invalidating the reservation causes the conditional store instruction to finish; and
    processing the interrupt.

2. The method of claim 1, further comprising the steps of:
    determining that the conditional store instruction is non-speculative and the oldest entry of a store queue; and
    reporting completion of the conditional store instruction before the counter reaches a predetermined count value.

3. The method of claim 2, further comprising the step of flushing a completion unit queue and beginning the processing of the interrupt.

4. The method of claim 1, further comprising the steps of:
    determining that the conditional store instruction is not the oldest entry of a store queue;
    converting the conditional store instruction to a nop instruction; and
    removing the conditional store instruction from a completion unit queue when the counter reaches a predetermined count value.

5. The method of claim 4, further comprising the step of flushing a completion unit queue and beginning the processing of the interrupt.

6. The method of claim 1, wherein the data processing system has one or more processors.

7. The method of claim 1, wherein the conditional store instruction is an instruction that requires a corresponding reservation of a memory location, wherein the corresponding reservation was established by a previously executed load and reserve instruction.

8. The method of claim 1, wherein the step of setting a reservation related to the conditional store instruction comprises setting an address and a valid bit in a reservation register corresponding to a location in a memory for the conditional store instruction.

9. A data processing system, comprising:
   a processor for executing instructions, the processor comprising:
      a memory unit;
      an instruction dispatch unit for fetching, decoding, and issuing a conditional store instruction;
      a reservation register for storing a reservation corresponding to a location in the memory unit to be used as a target for the conditional store instruction, wherein in response to the data processing system receiving an interrupt, the reservation is cancelled; and
      a completion unit having a counter and an instruction queue, wherein the counter is started in response to receiving the interrupt, and wherein the instruction queue is flushed when the counter reaches a predetermined count value allowing processing of the interrupt to begin.

10. The data processing system of claim 9, further comprising:
    a store queue having an oldest entry, the store queue for temporarily storing the conditional store instruction until the conditional store instruction is no longer speculative and any store instructions ahead of the conditional store instruction are performed, wherein when the conditional store instruction is the oldest entry of the store queue when the interrupt is pending, completion of the conditional store instruction is reported before the counter reaches a predetermined count value.

11. The data processing system of claim 10, further comprising a condition code register for storing a slate of the processor, wherein the state of the processor is updated with the success/failure of the conditional store instruction.

12. The data processing system of claim 9, further comprising:
    a store queue having an oldest entry, the store queue for temporarily storing the conditional store instruction until the conditional store instruction is no longer speculative and any store instructions ahead of the conditional store instruction are performed, wherein when the conditional store instruction is not the oldest entry of the store queue when the interrupt is pending, the conditional store instruction is converted to a nop instruction.

13. The data processing system of claim 9, wherein the data processing system further comprises:
    a second processor for executing instructions, the second processor comprising:
    a second memory unit;
    a second instruction dispatch unit for fetching, decoding, and issuing a second conditional store instruction; and
    a second reservation register for storing a second reservation corresponding to a location in the second memory unit to be used as a target for the second conditional score instruction, wherein in response to the second processor receiving a second interrupt, the second reservation is cancelled.

14. A data processing system comprising:
    a system bus;
    a memory coupled to the system bus;
    a first processor, coupled to the system bus, for executing instructions, the first processor comprising:
       a first instruction dispatch unit for fetching, decoding, and issuing a first conditional store instruction;
       a first reservation register for storing a first reservation corresponding to a location in the memory to be used as a target for the first conditional store instruction, wherein in response to the first processor receiving an interrupt, the first reservation is cancelled; and
       a completion unit having a counter and an instruction queue, wherein the counter is started in response to receiving the interrupt, and wherein the instruction queue is flushed when the counter reaches a predetermined count value allowing processing of the interrupt to begin; and
    a second processor, coupled to the system bus, for executing instructions.

15. The data processing system of claim 14, wherein the first processor further comprising:
    a store queue having an oldest entry, the store queue for temporarily storing the first conditional store instruction until the first conditional store instruction is not speculative and any store instructions ahead of the first conditional store instruction are performed, wherein when the first conditional store instruction is the oldest entry of the store queue and the interrupt is pending, completion of the first conditional store instruction is reported before the counter reaches a predetermined count value.

16. The data processing system of claim 14, further comprising:
    a store queue having an oldest entry, the store queue for temporarily storing the conditional store instruction until the conditional store instruction is no longer speculative and any store instructions ahead of the conditional store instruction are performed, wherein when the conditional store instruction is not the oldest entry of the store queue and the interrupt is pending, the conditional store instruction is converted to a nop instruction.

17. The data processing system of claim 14, wherein the second processor further comprising:
    a second instruction dispatch unit for fetching, decoding, and issuing a second conditional store instruction; and
    a second reservation register for storing a second reservation corresponding to a location in the memory to be used as a target for the second conditional store instruction, wherein in response to the second processor receiving an interrupt, the second reservation is cancelled.

* * * * *